(12) United States Patent
Hattori et al.

(10) Patent No.: US 8,131,920 B2
(45) Date of Patent: Mar. 6, 2012

(54) METHOD AND SYSTEM FOR DYNAMICALLY ALLOCATING READ AND WRITE SEQUENCE RANDOMIZER

(75) Inventors: Ryoheita Hattori, San Jose, CA (US); David H. Jen, San Jose, CA (US); Bernd Lamberts, Cupertino, CA (US); Remmelt Pit, Palo Alto, CA (US); Kris Schouterden, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 983 days.

(21) Appl. No.: 11/999,933

(22) Filed: Dec. 6, 2007

(65) Prior Publication Data

US 2009/0150637 A1    Jun. 11, 2009

(51) Int. Cl.
*G06F 12/00* (2006.01)
(52) U.S. Cl. ............... 711/112; 711/E12.004; 714/702
(58) Field of Classification Search ............... None
See application file for complete search history.

(56) References Cited

U.S. PATENT DOCUMENTS

| | | | |
|---|---|---|---|
| 4,993,029 A | 2/1991 | Galbraith et al. | |
| 5,889,796 A | 3/1999 | Whaley | |
| 6,052,815 A | 4/2000 | Zook | |
| 6,167,550 A | 12/2000 | Gray | |
| 6,177,890 B1 | 1/2001 | Keirn et al. | |
| 6,195,732 B1 | 2/2001 | Adams et al. | |
| 6,208,477 B1 | 3/2001 | Cloke et al. | |
| 6,392,829 B1 * | 5/2002 | Stoutenburgh et al. | 360/39 |
| 6,687,375 B1 | 2/2004 | Matyas, Jr. et al. | |
| 6,757,845 B2 | 6/2004 | Bruce | |
| 6,898,038 B1 | 5/2005 | Fennema et al. | |
| 7,124,305 B2 | 10/2006 | Margolus et al. | |
| 7,167,330 B2 | 1/2007 | Elliott et al. | |
| 7,181,641 B2 | 2/2007 | Greenwald et al. | |
| 2002/0046359 A1 | 4/2002 | Boden | |
| 2004/0258398 A1 | 12/2004 | Cho et al. | |
| 2005/0270855 A1 | 12/2005 | Earhart et al. | |
| 2006/0085644 A1 | 4/2006 | Isozaki et al. | |
| 2006/0203367 A1 | 9/2006 | McAuliffe et al. | |
| 2006/0248427 A1 | 11/2006 | Katayama et al. | |
| 2006/0294331 A1 | 12/2006 | Forrer et al. | |

OTHER PUBLICATIONS

Fu, Kevin E., "Group Sharing and Random Access in Cryptographic Storage File Systems", *Massachusetts Institute of Technology*, (Jun. 1999),1-85.
Ben-Asher, et al., "Overcomming Malicious Read/Write Requests in Internet File", *Computer Science Dept. Haifa University*, (Aug. 4, 2004),1-22.
Damgard, et al., "Universally Composable Disk Encryption Schemes", *Dept. of Computer Science, Aarhus University*, (2005),1-15.

* cited by examiner

*Primary Examiner* — Pierre-Michel Bataille
*Assistant Examiner* — John P Fishburn (57) ABSTRACT

A data formatting system and method to improve data efficiency and integrity in a hard disk are disclosed. One embodiment provides a disk drive system having a plurality of lookup tables which store a plurality of randomizer seeds which may be dynamically encoded into the preamble field of a customer data block if the customer data is deemed marginal. Encoding the randomizer seed into the preamble field prevents adjacent data track mis-writes and mis-reads.

5 Claims, 8 Drawing Sheets

METHOD AND SYSTEM FOR DYNAMICALLY ALLOCATING READ AND WRITE SEQUENCE RANDOMIZER

TECHNICAL FIELD

The present invention relates to the field of hard disk drive development and manufacturing, and more particularly to a method and system for dynamically allocating write sequence randomizers.

BACKGROUND ART

Hard disk drives (HDD) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

The basic hard drive also typically includes a magnetic medium for storing data in magnetic form and the magnetic transducers are used to read and write magnetic data respectively off read and write tracks on the disks in the hard disk drive. A typical hard disk drive includes one or more disks which are mounted on a spindle motor. The spindle motor rotates the disks during read and write operations.

Figure 1:
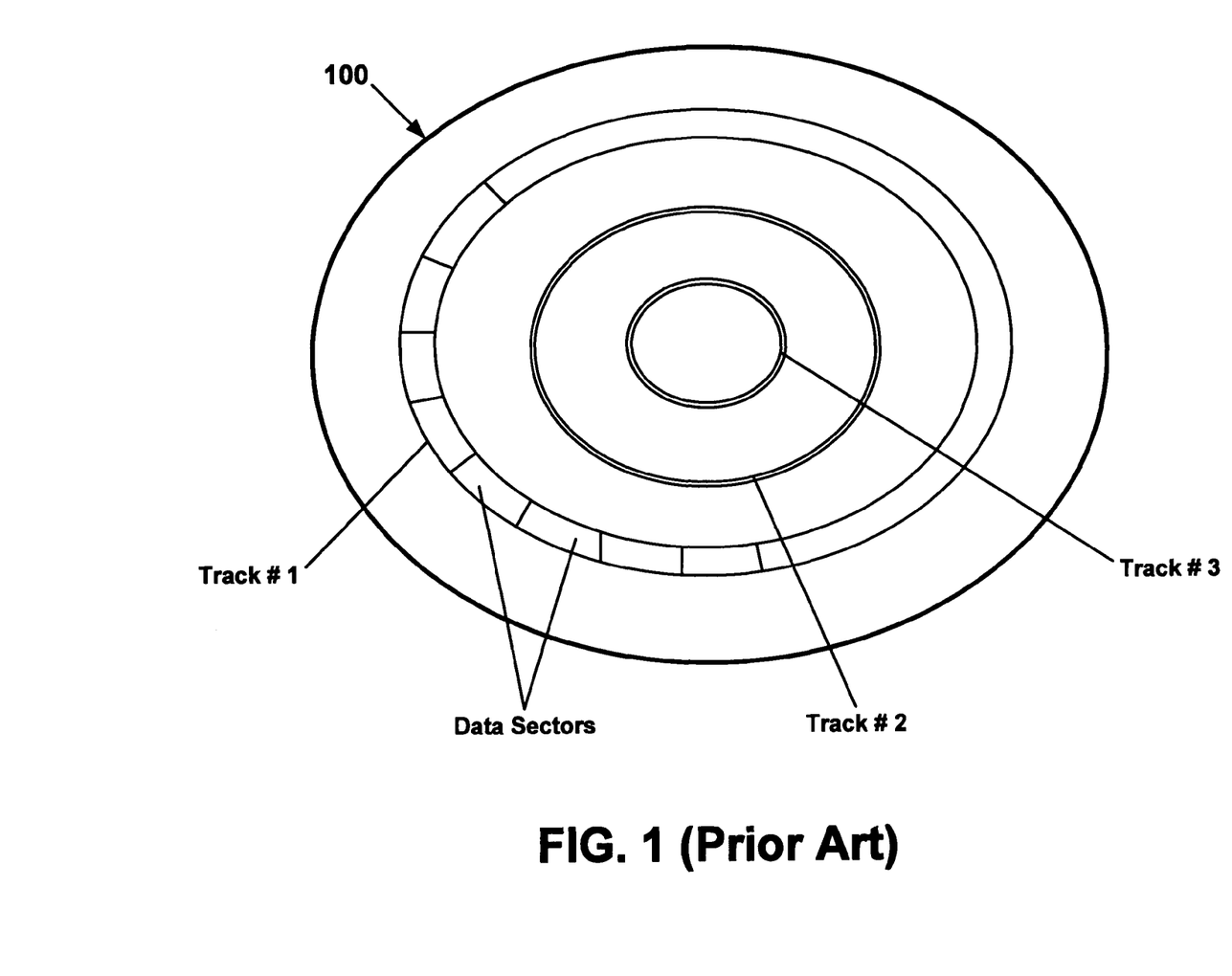
FIG. 1 is top perspective view of a disk with concentric tracks of the conventional data storage device.

Information on the disks are typically stored in the form of magnetic transitions on a series of concentric spaced tracks, as shown in FIG. 1, formatted on the surface of the magnetic disks. The tracks are severally divided into a number of sectors with each sector comprising a number of information fields including fields for storing customer data, sector identification and synchronization information.

An actuator assembly typically including a number of arms with one or more transducers and sliders that fly over the surface of the disks as the rotation of the spindle motor increases causing the head to hover above the disk in an air bearing produced by the high speed disk rotation to read and write to and from the tracks.

Figure 2:
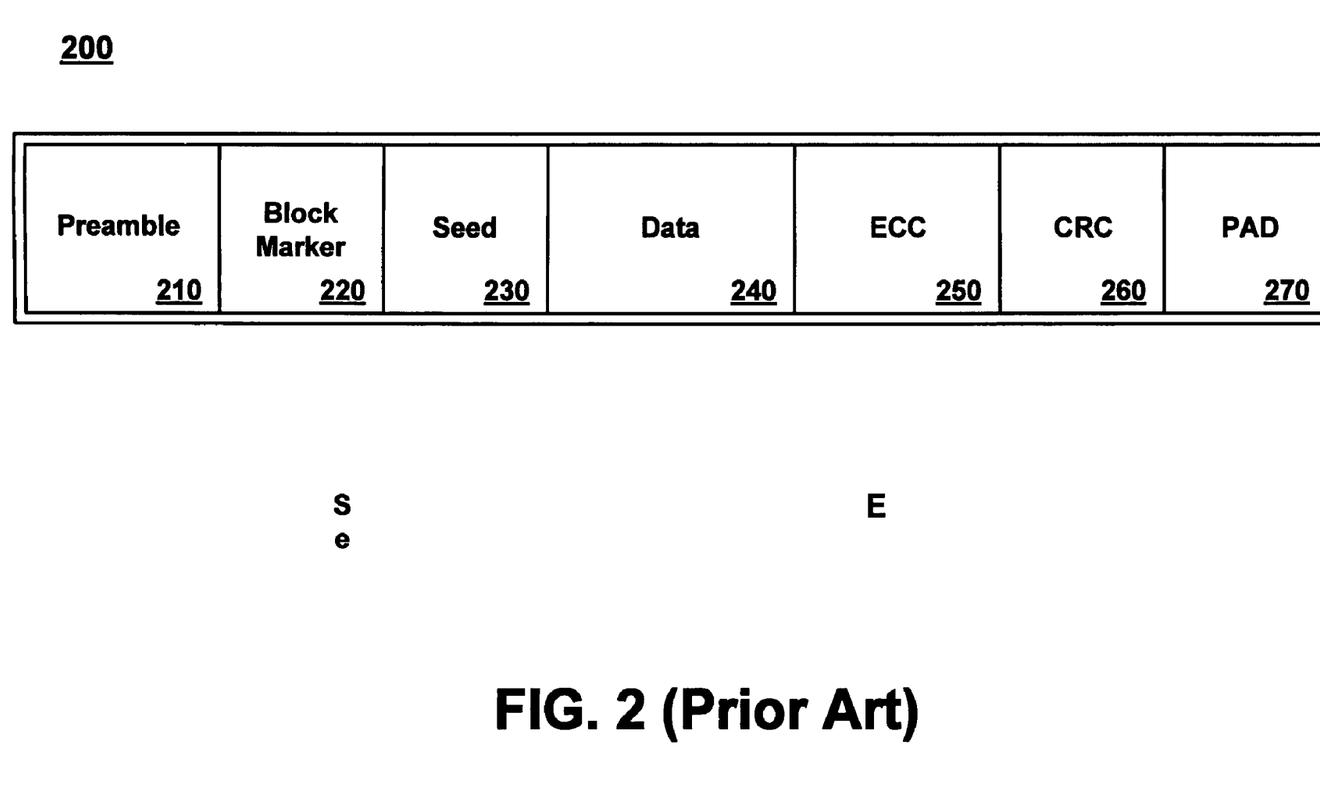
FIG. 2 is an exemplary block diagram of a conventional data block with a randomizer seed field of disk of a conventional data storage device.

In conventional hard disk drives, the data section include predefined customer data and a number of fields that store specific types of information that are both unique to the customer and to the drive. Such fields may include one or more synchronization fields, an error correction code (ECC) field, a cyclic redundancy code field (CRC), a seed randomizer field and a pad field. FIG. 2 illustrates a conventional data block that is written to each sector in the tracks. The data block shown in FIG. 2 is encoded for storage in the disk.

As shown in FIG. 2, each data block includes a preamble field 210, a block marker field 220, a randomizer seed field 220, a cyclical redundancy field 230, a data field 240, an error correction field 250 and a data pad 260. As shown in FIG. 2, each data block includes a preamble field, a block maker field, a randomizer seed, a data portion, a cyclical redundancy check (RC), a pad and an error correction field. The preamble bit sequence is selected to produce a read head response during a subsequent read process that is easy for the read channel to acquire phase lock with in preparation for decoding that data that follows. In the data block shown in FIG. 2, the randomizer seed is used to randomize the data portion and typically consists of a three byte sequence which is selected for each data field.

The pseudo random data sequence based randomizer is generally used to improve the reliability of the write and retrieval process. The randomizer is generally used to avoid worst-case data pattern sequence from being written or read to adjacent track thereby reducing interference between tracks. In the conventional data sector shown in FIG. 2, the randomizer seed is typically hard-coded with a fixed seed value in the randomizer field. To reduce the presence of errors in the customer data, the randomizer seed is typically hard-coded with a fixed seed.

Unfortunately hard-coding the seed code may result in the random data sequencer generating worst case data patterns to be written to sectors in the tracks. Thus, if a customer uses or prefers for some reason such a pattern, the drive may be initialized with a problematic randomizer seed.

In the conventional data block shown in FIG. 2, the assignment of the randomizer seed for each cylinder of the data tracks are hard-coded (fixed) thereby restricting the flexibility for a user to change the code in the event of errors or misreads. In addition to the above short comings, the conventional data sector lends itself to low signal to noise ratio between tracks and therefore often results in the wrong tracks written or read when a worst-case data pattern is initialized.

There is therefore a need for an improved data formatting approach which provides for efficient and flexible data decoding that allows for a dynamic allocation of randomizer seeds to reduce adjacent track interference and improve data integrity.

SUMMARY

In accordance with certain aspects of the present invention, manufactured disk drives in the manufacturing environment are encoded with a dynamic sequence randomizer allocation mechanism for dynamically allocating sequence randomizers for customer data being read or written to a disk drive. One embodiment provides a dynamic read and write allocation sequence randomizer which advantageously encodes randomizer seed in the sync field of data sectors of data pattern being read or written to a storage disk.

In one embodiment, a plurality of lookup tables are generated to store randomizer codes which may be dynamically encoded into the data pattern of customer data being written or read. A predictive code provided in the dynamic sequence randomizers of the present invention monitors data patterns being read or written to determine when a worst-case data pattern is present in the disk drive and allows for the dynamic switching of the randomizer seeds using the pre-stored randomizer seed in the lookup table to read or write the data. In one embodiment a histogram of the lookup table is kept to enable the disk drive to detect worst-case data pattern to aid in the reassignment of the randomizer seed.

While the invention is amenable to various modification and alternative forms, specifics thereof have been shown by way of example in the drawings and will be described in detail herein below.

DETAILED DESCRIPTION OF VARIOUS EMBODIMENTS

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for dynamically allocating randomizer seeds for sequencing data patterns in a data storage system.

Overview

In general, the HDD comb (also referred to as an E-block) serves as a platform on which the suspensions (compliant members containing sliders with recording heads) are mounted. The recording heads fly at a constant height (on the order of nanometers) above the disk surface tracking pre-written servo information. An HDD carriage assembly forms the primary motive mechanical system that enables a disk-drive to randomly access data to be written or recorded on the disk surfaces.

Figure 3:
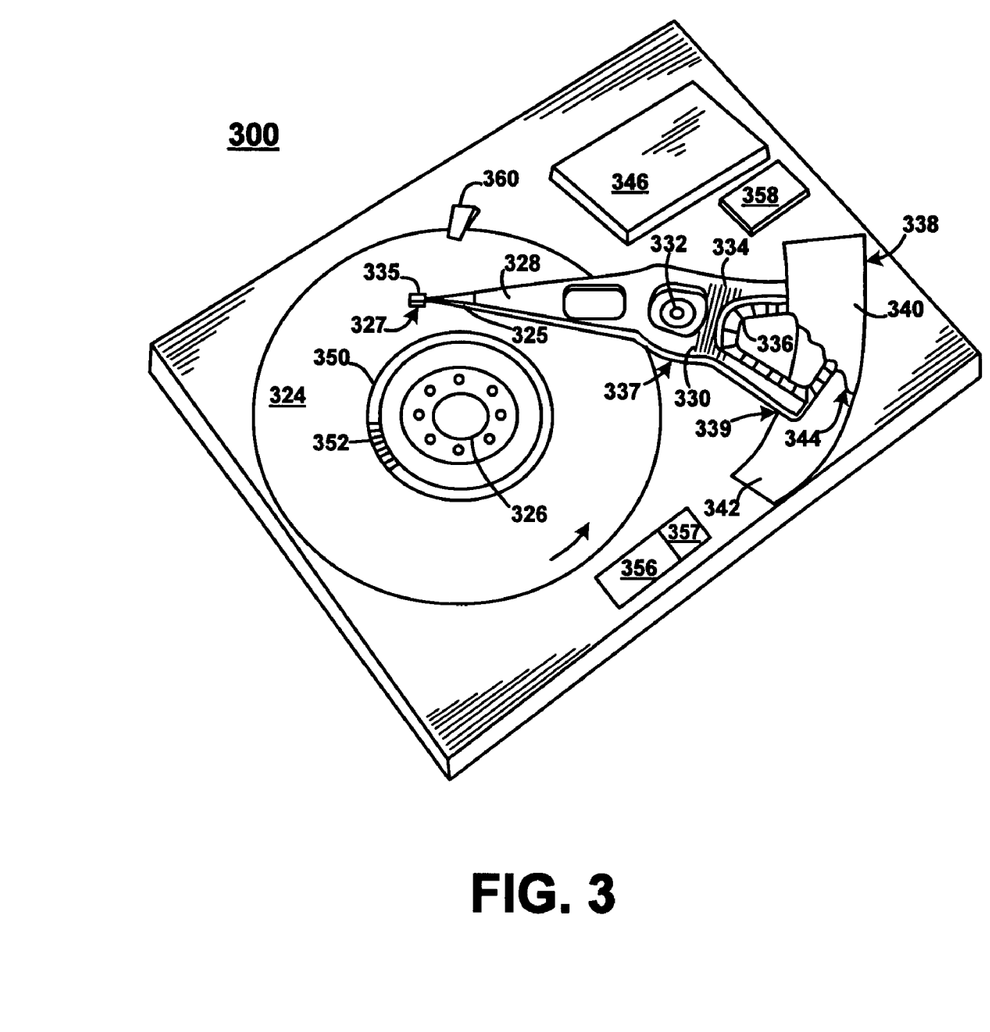
FIG. 3 is a top perspective view of a disk drive system with its upper housing cover removed, in accordance with one embodiment of the present invention.

FIG. 3 illustrates one embodiment of a data storage system 300 in accordance with the teachings of an embodiment of the present invention. As shown in FIG. 3, each disk 324 is typically magnetically formatted to include a number of spaced concentric tracks similar to those shown in FIG. 1. Digital information is typically stored in the form of magnetic transitions along the tracks 350. The tracks 350 are generally divided into a number of information fields, including fields for storing data and synchronization information including randomizer seed information according to the teachings of the present invention.

Writing data to a magnetic storage disk 324 generally involves passing a current through the write element of the transducer assembly 327 to produce magnetic lines of flux which magnetizes a specific location of the disk surface 324. Reading data from a specified disk location is normally accomplished by a read element of the transducer assembly 327 sensing the magnetic field or flux lines emanating from the magnetized locations of the disk surface 324.

The disk storage system 300 shown in FIG. 3 preferably employs a closed-loop servo control system for positioning the read/write transducers 327 to specified storage locations on the data storage disk 324. During normal data storage system operation, a servo transducer is employed to read information for the purpose of following a specified track and locating specified track and data sector location on the disk surface 324. In one embodiment of the present invention, the signal to noise ratio (SNR) between tracks is made big enough to prevent the inadvertent reading or writing of adjacent tracks. Making SNR large enough ensures that in the event the head reads or writes to the wrong track, that write or read operation will fail. In one embodiment of the present invention, alternating use of randomizer seeds for adjacent tracks prevents the inadvertent reading of adjacent tracks.

In one embodiment of the present invention, the randomizer seed implementation of the present invention provides for improved track format efficiency in a direct access storage device by incorporating the randomizer seed code in the sync field required to complete a write operation. Incorporating the randomizer seed in the sync field allows the system to be able to dynamically allocate the randomizer seed code and thereby reduce the data corruption and track mis-reads associated with the conventional art.

Figure 4:
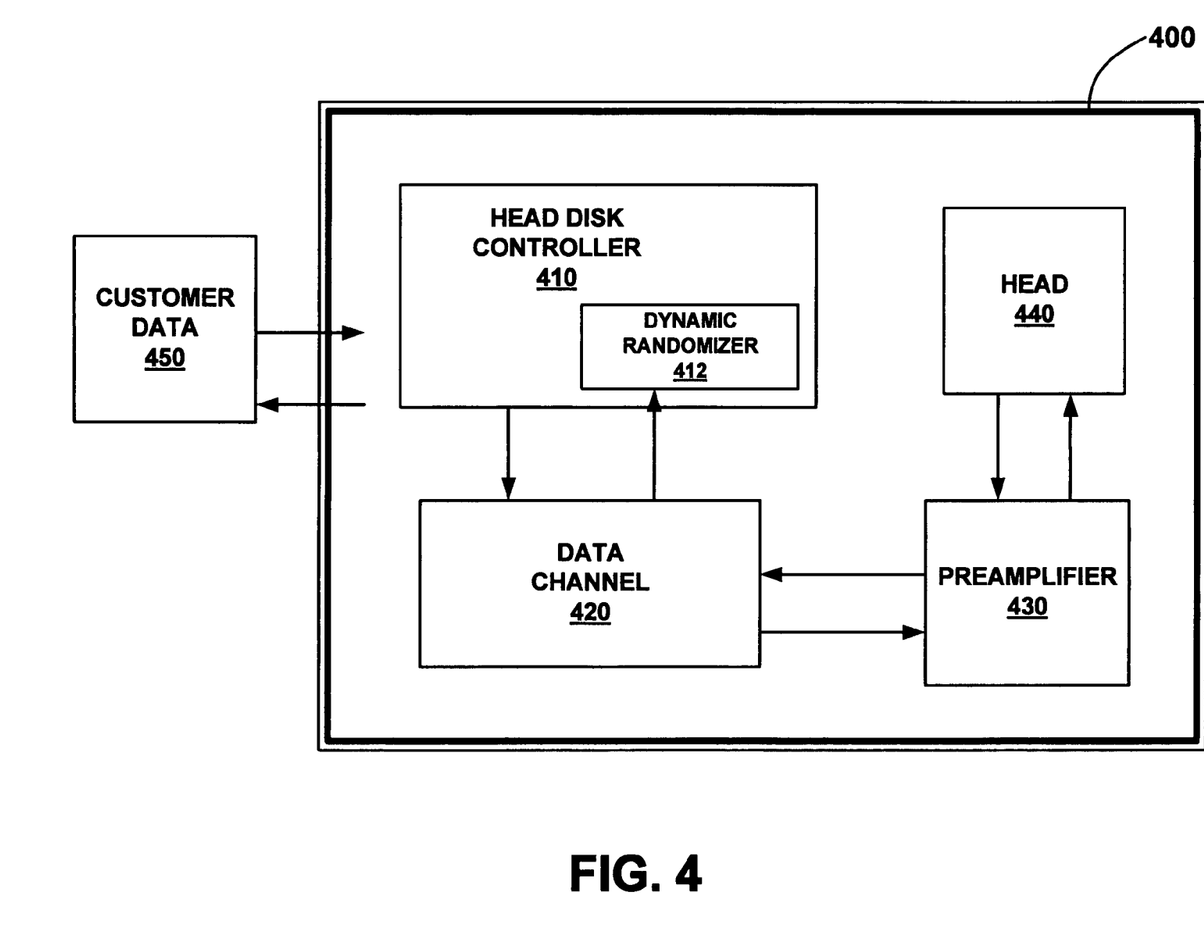
FIG. 4 is a block diagram illustration of one embodiment of a disk file system for implementing one embodiment of the present invention in a hard disk drive.

With reference now to FIG. 4, an illustration of one embodiment of a disk file system for implementing an embodiment of the present invention is shown. The disk file system 400 shown in FIG. 4 includes hard disk controller 410, data channel 420, preamplifier 430 and head 440. In one embodiment of the present invention, the dynamic sequence randomizer 412 is implemented in the hard disk controller 410. Implementing the dynamic sequence randomizer 412 in the hard disk controller 410 enables the present invention, unlike the conventional art, to have the randomizer on the disk drive to allow for the dynamic allocation of the randomizer seed as data is written or read.

In one embodiment of the present invention, the dynamic allocation of randomizer seed is implemented by verifying customer data. The data channel 420 uses sampling techniques for detecting readback signals from the disk surfaces that contain the customer data. The disk controller 410 performs all the memory management running firmware to the actuator to the disk.

In one embodiment, the dynamic sequence randomizer includes predictive code which monitors the customer data pattern being written or read to determine if a marginal data pattern matches that presented by the customer data 450. During a data readback, if the hard disk controller 410 detects a marginal data stream (worst case data) the data channel 420 assigns the correct seed setting provided by the dynamic sequence randomizer 412 from the sync field to ensure that the integrity of the data is preserved.

The invention encodes the randomizer seed into the sync field because the sync field with bit information indicates which look-up table to choose to dynamically assign the appropriate randomizer seed for a particular read/write operation. In one embodiment, the signal to noise ratio between adjacent tracks is made large enough to prevent mis-reads or mis-writes between tracks. In one embodiment, alternating randomizer sequences are assigned to alternating tracks so that even if the tracks have the same information, a marginal pattern is avoided from being read or written.

In an alternative implementation, the drive monitors the Bit Error Ratio performance for the variously used randomizers in the form of a histogram. In one embodiment, the histogram may be the same for all seeds generated by the dynamic sequence randomizer 412

Figure 5:
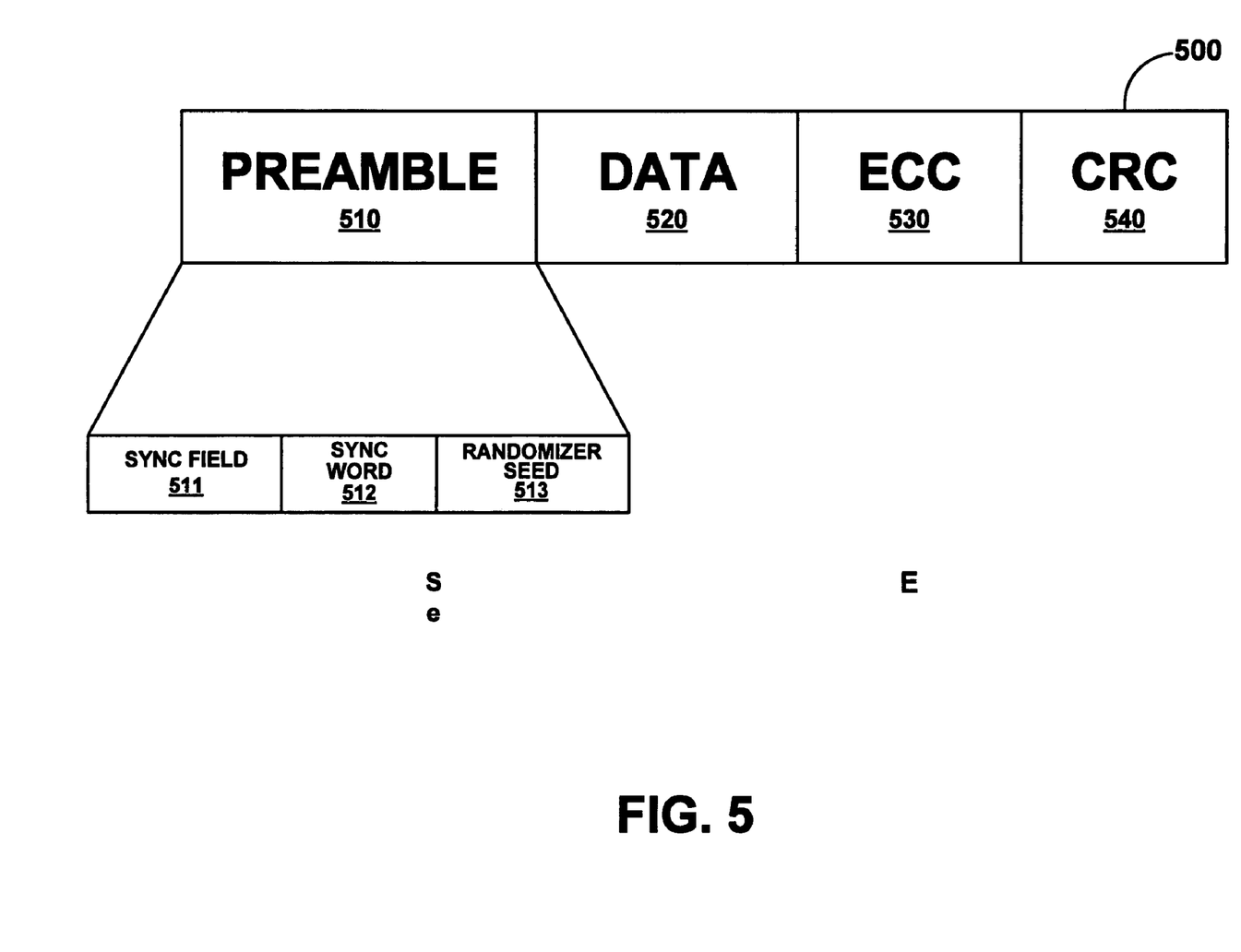
FIG. 5 illustrates various fields of a data sector including a seed randomizer field advantageously incorporated into the preamble field in accordance with the teachings of one embodiment of the present invention.

With reference now to FIG. 5 an illustration of one embodiment of a data sector of a data track in accordance with one embodiment of the present invention is shown. The data block shown in FIG. 5 advantageously eliminates the separate randomizer seed field of the conventional art and incorporates the randomizer seed into the preamble field 510 in accordance with the teachings of the present invention.

Data is written to a data storage disk according to a sequential format. The data sector 500 shown in FIG. 5 includes a sync field 510 which includes synchronization patterns that allow the data channel to acquire the clock frequency, and a sync word 511 which includes a pattern that identifies the start of the encoded customer data. The sync field 510 also includes the randomizer seed or code 512 which is dynamically encoded according to the teachings of the present invention.

In one embodiment of the present invention, the randomizer seed 512 is advantageously incorporated into the sync field 510 thereby eliminating the need for a separate randomizer seed field. Incorporating the randomizer seed code 512 into the sync field 510 improves format efficiency and allows for more customer data to be stored on the media per unit area. Encoding the randomizer seed 512 into the sync field 510 also minimizes error propagation, thereby reducing the reading and writing to the wrong tracks in the disk. In one embodiment, the randomizer seed code is about 4 bits of information.

In a typical conventional disk drive, the randomizer seed allows a marginal data pattern (worst case) which is typically a sequence of zeros pattern. Thus, if the disk drive control code encounters the zero pattern, the randomizer seed allocation could be dynamically switched to a different setting which removes the exposure to the marginal data pattern. In one embodiment, the data channel assigns the correct seed setting from the sync (preamble) field 510 to the correct pattern to protect the integrity of the data. Customer data is stored in a customer data field 520.

The customer data to be written to the HDD is applied to an encoder which encodes the customer data according to pre-established coding schemes. For example, the customer data may be encoded to include timing information to enable the efficient readback processing in the HDD. Error correction code (ECC) is stored in the ECC field 530 toward the end of the data sector 500 to provide the capability to correct certain errors that occur within the sector 500.

Figure 6:
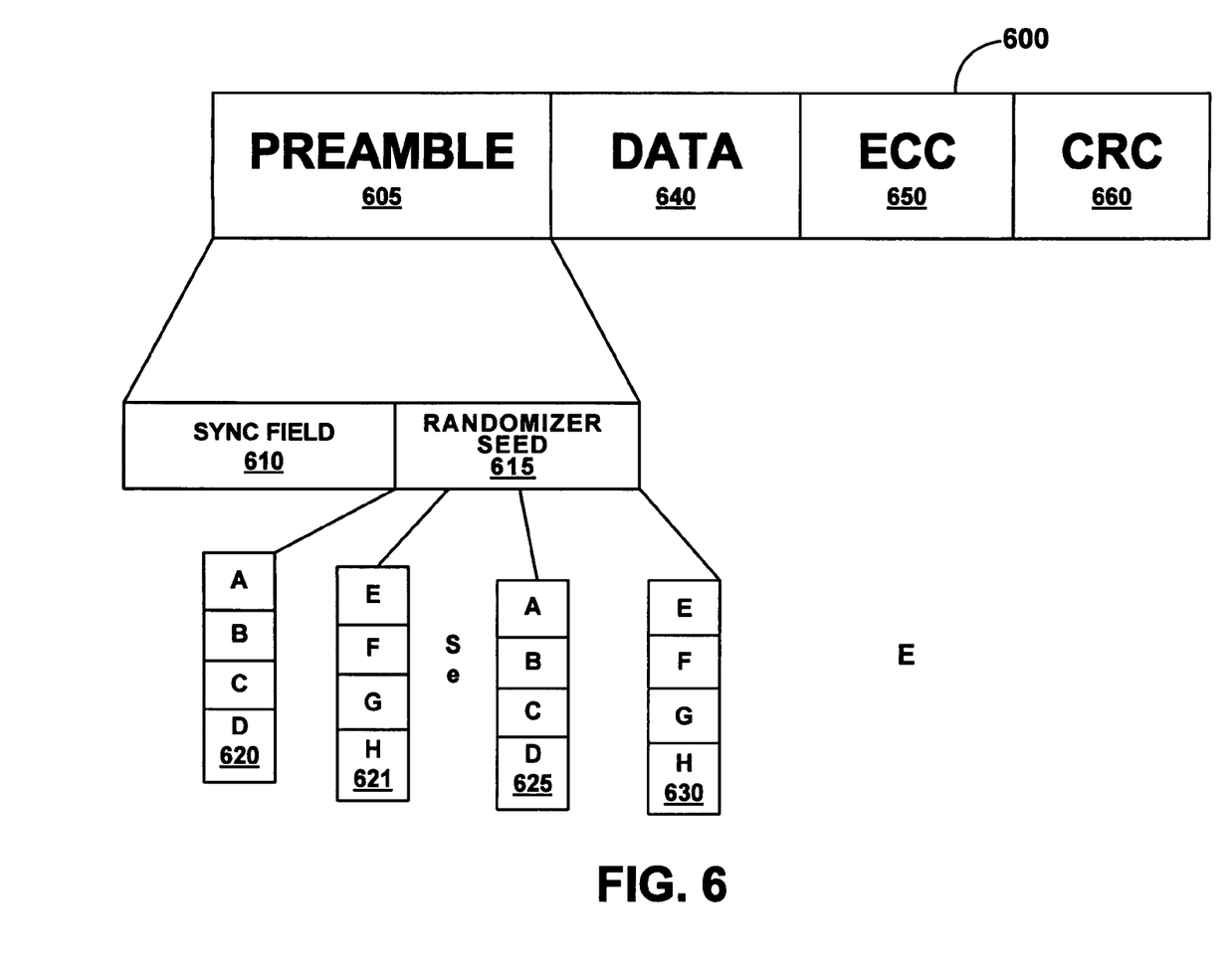
FIG. 6 illustrates various fields of a data sector including a seed randomizer field advantageously incorporated into the preamble field and an embodiment of look-up tables utilized by the randomizer seed field in accordance with the teachings of one embodiment of the present invention.

With reference now to FIG. 6 an illustration of one embodiment of a data sector of a data track in accordance with one embodiment of the present invention is shown. The data block shown in FIG. 6 advantageously eliminates the separate randomizer seed field of the conventional art and incorporates the randomizer seed into the preamble field in accordance with the teachings of the present invention. Data is written to a data storage disk according to a sequential format.

The data sector 600 shown in FIG. 6 includes a sync field 610 which includes synchronization patterns that allow the data channel to acquire the clock frequency, and a sync word 611 which includes a pattern that identifies the start of the encoded customer data. The sync field 610 also includes the randomizer seed or code 612.

In one embodiment, the randomizer seed code 612 is an encoding block size of 4 bits which indicates which look-up tables 620-630 to search to retrieve the appropriate randomizer code for a particular data sequence pattern. The 4 bits are dynamically written data to represent the randomizer seed code.

In one embodiment, look-up tables 620-630 store data sequences for even and odd tracks on the disk. Using the look-up tables 620-630, the present randomizer implementation of the present invention is able to generate a large signal to noise ratio between adjacent tracks to avoid the reading or writing to the wrong track. In one embodiment, the lookup tables 620-630 are generated by merging good and bad patterns and may be changed depending on the environmental conditions of the disk drive.

Figure 7:
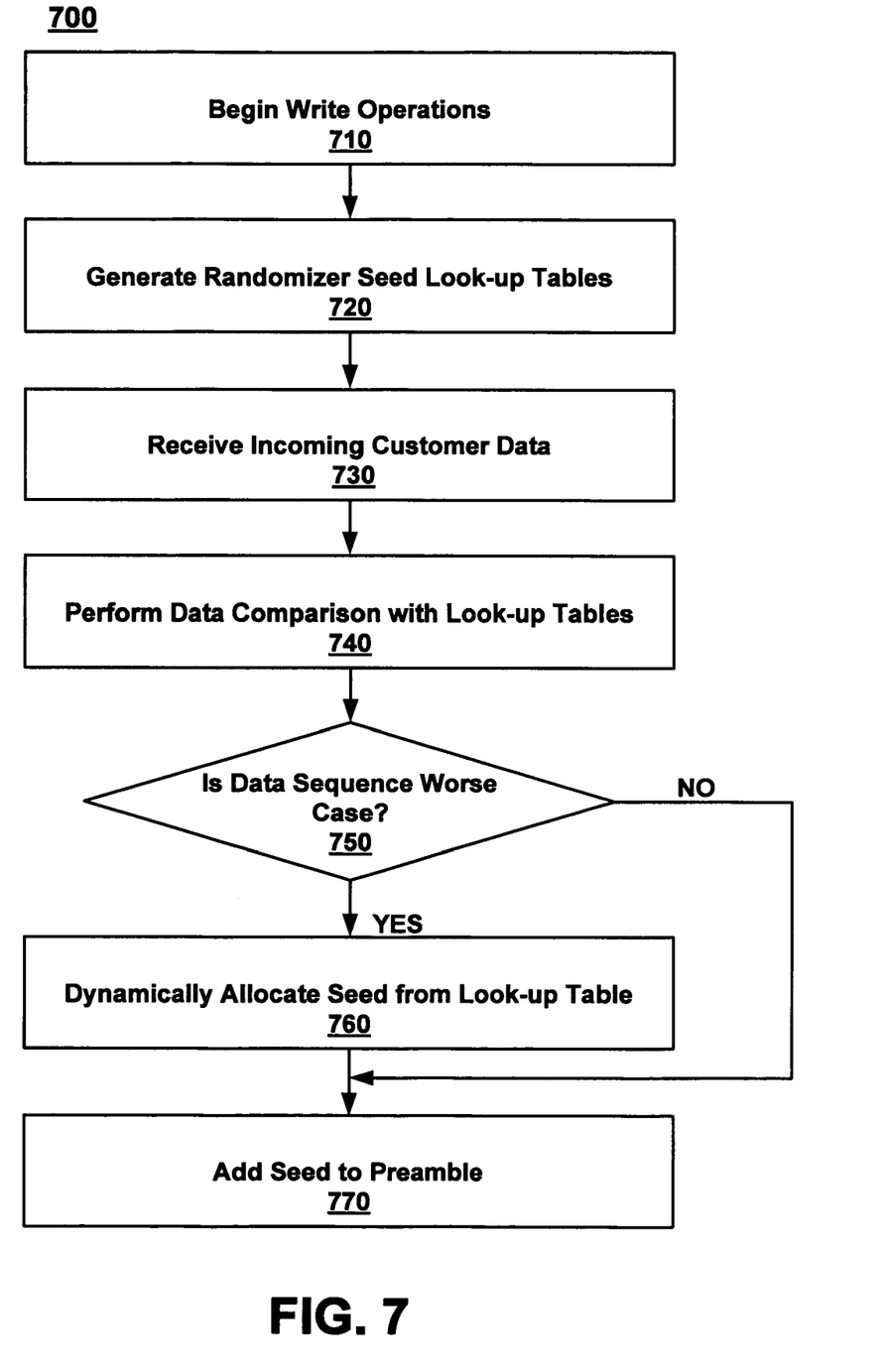
FIG. 7 illustrates various operations associated with performing a write operation in accordance to one embodiment of the present invention.

Referring now to FIG. 7 is a depiction of one embodiment of a write operation of the present invention. A write operation is initiated 710 when the dynamic sequence randomizer 412 generates 620 a number of look-up tables with a sequence of randomizer seeds. An incoming customer data sequence 630 is received for decoding to determine whether the incoming data pattern to be written is marginal (worst-case).

During the decoding of the incoming customer data pattern, the randomizer seed code of the preamble field is compared 640 with the look-up table to determine whether the incoming data pattern to be written is marginal 650 (worst-case). If the incoming data pattern is marginal, an appropriate randomizer seed from the look-up tables is written 660 to the sync field of the data.

Figure 8:
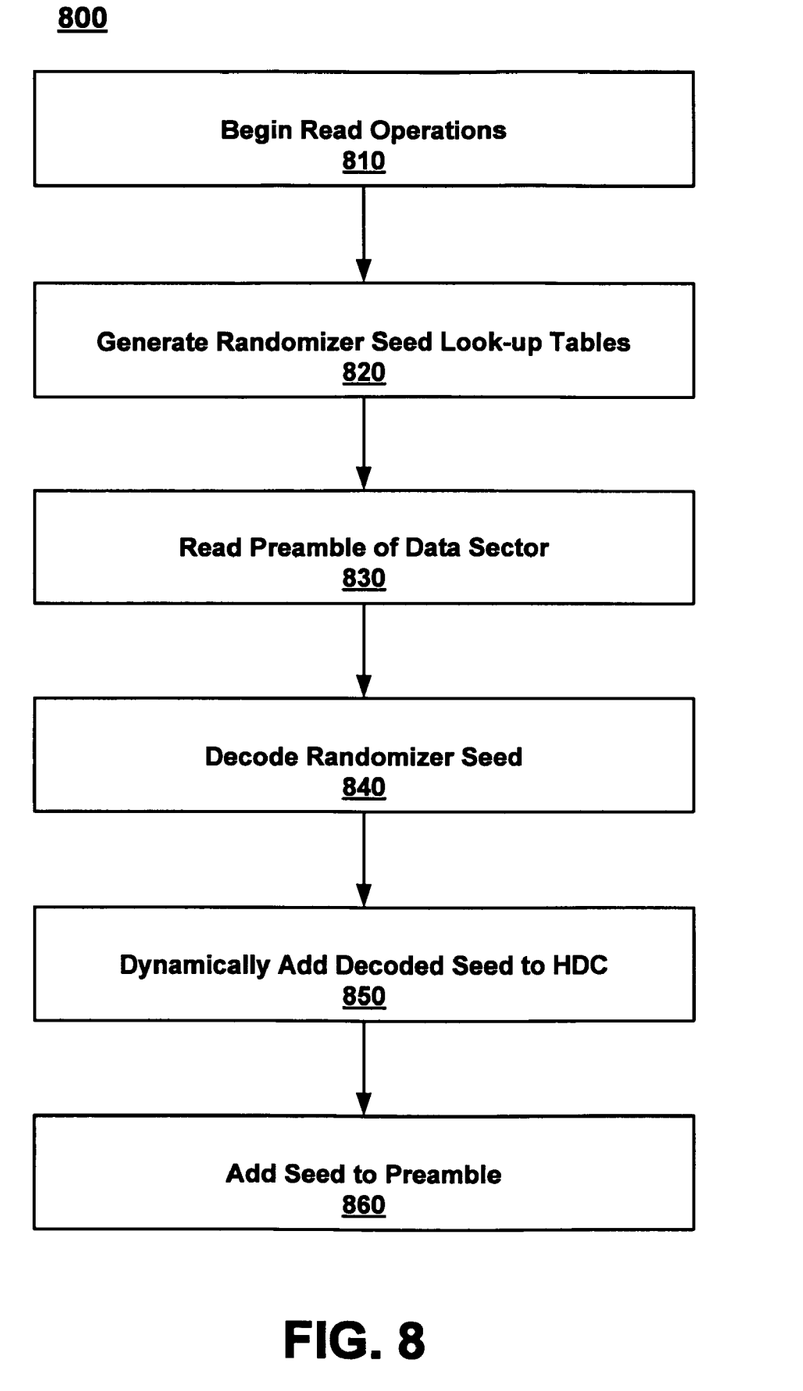
FIG. 8 illustrates various operations associated with performing a read operation in accordance to one embodiment of the present invention.

Referring now to FIG. 8 is a depiction of one embodiment of a read operation of the present invention. As depicted in FIG. 8, a read operation is initiated 810 by ensuring that a chosen randomizer seed is added to the preamble 830 associated with a particular data pattern being read. The preamble is then read and the randomizer is decoded 840. The data channel then communicates with the hard disk controller to let the hard disk controller know of which lookup table should be used for the decoded randomizer. The randomizer is decoded to retrieve the associating seed from the preamble.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A hard disk drive, comprising:
a dynamic data sequence randomizer;
a plurality of lookup tables coupled to the dynamic data sequence randomizer;
predictive code for looking up a first of a plurality of predefined randomizer seeds defined in the plurality of lookup tables;
compare logic for comparing data of an input data stream written to the hard disk drive according to said first randomizer seed to said data of said input data stream written to said hard disk drive according to another of said plurality of predefined randomizer seeds to determine whether said data of said input data stream is marginal; and a data encoder for dynamically encoding either said first randomizer seed or said another randomizer seed of the lookup tables into a preamble field of a data sector of the data of the input data stream based on said comparing.

2. The hard disk drive of claim 1, wherein the dynamic data sequence randomizer dynamically generates randomizer seeds for read or write operations responsive to a particular input data in the hard disk drive.

3. The hard disk drive of claim 2, wherein the plurality of lookup tables store randomizer seeds for odd and even data tracks respectively in the hard disk drive.

4. The hard disk drive of claim 3, wherein encoding the randomizer seed into the preamble field of the data sector of the input data increases the signal to noise ratio between adjacent data tracks in order to prevent adjacent track interference.

5. The hard disk drive of claim 4, wherein the plurality of lookup tables may store alternating randomizer seed for alternating data tracks in the hard disk drive.

* * * * *